March 14, 1972     C. K. MOREHOUSE ET AL     3,649,363

WATER ACTIVATABLE BATTERY

Filed Sept. 2, 1970

Inventors
C. K. Morehouse
R. F. Amlie
By Glenn A. Buse
Attorney

United States Patent Office 3,649,363
Patented Mar. 14, 1972

3,649,363
WATER ACTIVATABLE BATTERY
Clarence Kopperl Morehouse, Mequon, and Robert F. Amlie, Milwaukee, Wis., assignors to Globe-Union Inc.
Filed Sept. 2, 1970, Ser. No. 68,954
Int. Cl. H01m 21/14
U.S. Cl. 136—114       12 Claims

ABSTRACT OF THE DISCLOSURE

A water-activatable storage battery with each cell having a container storing a measured amount of concentrated electrolyte positioned above the battery elements, a container-opening assembly, which includes an electrical heating element electrically connected between the positive and negative plates of the battery element and positioned in contact with the electrolyte container, and a small quantity of a water-soluble, electrolytic material. Upon addition of water into the cell, the electrolytic material is dissolved therein to form an electrolytic solution which, along with the battery plates, acts as a voltaic cell to energize the heating element, which in turn melts a discharge opening into the electrolyte container thereby allowing the concentrated electrolyte to drain therefrom and activate the battery.

BACKGROUND OF THE INVENTION

Field of the invention

This invention relates to a water-activatable storage battery, and more particularly, to a dry charge storage battery having means for retaining a concentrated electrolyte within the battery casing which is subsequently released upon the addition of water to the battery.

Description of the prior art

Dry charge lead-acid batteries adapted to be activated by the addition of sulfuric acid are in wide use. Such batteries require the addition of the sulfuric acid at the point of use. This on-the-site addition of sulfuric acid by the retailer or user requires the separate transportation and storage of the acid, as well as the handling of the acid by personnel at the time of battery activation. The hazards presented by the required handling of the acid for activation of dry charge batteries are obvious. Furthermore, the cost associated with transportation of sulfuric acid are significant because of the special handling requirements and the added weight of water which is a substantial portion of the diluted acid electrolyte. Also, conventional dry-charge batteries do not activate readily at low temperatures. This problem is customarily overcome via heating the battery by applying a boost charge thereto after adding electrolyte. The resulting expense and delay are often objectionable.

Many attempts have been made to manufacture dry charge storage batteries which obviate the handling and storage problems outlined above. One general approach has been to provide a reservoir containing a measured amount of concentrated liquid sulfuric acid within each battery cell adapted to be ruptured or disintegrated at the time or after water is added to the cell. For example, U.S. Pat. 2,832,814 discloses a construction wherein a reservoir of acid located above the plates in each cell can be emptied into its associated cell by removing a stem-like closure device which opens a discharge hole in the bottom of the reservoir. This closure device is removed from the battery through the filling port. One disadvantage of this construction is that the stem-like device may be accidentally depressed during handling of the battery; thus, inadvertently causing premature emptying of the reservoir and consequential destruction of the battery element by the concentrated sulfuric acid. Also, there is the likelihood of the electrolyte being splashed outside the battery upon the removal of the stem by personnel activating the battery.

Similar constructions utilizing mechanical approaches for rupturing a reservoir of concentrated acid, with the same general disadvantages, are disclosed in U.S. Pats. 2,773,927 and 3,455,740.

A different approach utilizing chemical means for rupturing the reservoir of concentrated sulfuric acid is disclosed in U.S. Pat. 3,304,202 whereby concentrated sulfuric acid is stored in a reservoir made from a material which is water insoluble but soluble in an organic solvent. An organic solvent, stored in a capsule made from a water-soluble material, is mounted on top of the reservoir of acid. Upon the addition of water when the battery is activated, the solvent capsule dissolves, thereby releasing the organic solvent which in turn dissolves the reservoir to release the concentrated sulfuric acid. The primary disadvantage of this system is that the area and rate of dissolution of the acid reservoir by the solvent is highly unpredictable; therefore, the rate of acid release from the reservoir is also highly unpredictable. A controlled and predictable rate of release of the concentrated sulfuric acid is very important. It is well known that a reasonably large quantity of heat is released when concentrated acid is mixed with water. If the acid is added too rapidly, the amount of heat generated can cause damage to the separators and other battery components. Also, the acid reacts with the battery plates causing the evolution of carbon dioxide, oxygen, hydrogen and other gases therefrom. If the acid is added too rapidly, the resultant evolution of gases can become so vigorous that the acid boils out through the filling ports with the incumbent hazards associated therewith. Thus, it can be seen that the unpredictability of the rate of acid release associated with this system is highly undesirable.

SUMMARY OF THE INVENTION

An object of this invention is to provide an improved, water-activable dry charge battery which overcomes the above problems and can be activated by relatively untrained personnel.

Another object of this invention is to provide such a battery wherein the possibility of premature release of electrolyte is minimized and the electrolyte is released in a controlled manner upon activation.

A still further object of this invention is to provide such a battery which can be activated by merely adding water to each battery cell.

According to this invention, each battery cell is provided with a container, which is made from a water-insoluble and electrolyte-resistant material and stores a measured amount of concentrated electrolyte, disposed above the battery elements, a container opening means which includes an electrical heating element electrically connected between the positive and negative plates of the battery element and positioned in contact with the electrolyte container, and a small quantity of water-soluble electrolytic material. As the water is added to each battery cell, the electrolytic material is dissolved therein to produce an electrolytic solution. The battery plates, electrically connected through the heating element, and the electrolytic solution act as a voltaic cell. As electrical current flows through the heating element, it becomes heated and melts a discharge opening into the electrolyte container thereby allowing the electrolyte to flow therefrom and mix with the water.

In a preferred embodiment, the electrolyte container, positioned in the cell above the plate is in the form of a thin flexible bag of plastic material, e.g. polyethylene, and the container-opening means includes an activator assembly which is arranged to prevent the water from contacting the heating element and has a metering device which controls the rate at which the electrolyte flows from the electrolyte container.

With this invention the battery can be activated by merely adding water to each of the battery cells; no additional steps are necessary. Therefore, relatively untrained personnel can safely and readily activate the battery embodying this invention. Furthermore, as the concentrated electrolyte mixes with the water, sufficient heat is generated to eliminate the necessity of a boost charge normally required for low temperature activation of conventional dry charge batteries.

The electrolyte stored in the container can be sulfuric acid in concentrated form, e.g. sulfuric acid having a specific gravity of 1.835, or a thickened, flowable gel. Moreover, it should be appreciated that the use of the electrolyte container and container opening means in accordance with this invention is not restricted to lead-acid batteries. Batteries of the alkaline-type, such as nickel-cadmium, iron, zinc and the like, employing concentrated alkaline electrolytes such as potassium hydroxide can also be used.

The material used for making the electrolyte container should be water-insoluble and non-reactive with the concentrated electrolyte container therein. The material should also have a reasonably high resistance to the permeation of concentrated electrolyte, both the liquid electrolyte and vapors thereof, in order to minimize adverse corrosion of the internal components of the battery during storage. In addition to the above criteria, the type and thickness of the material used for the electrolyte container should provide sufficient structural integrity so that a filled container can withstand the impact loads imposed upon the battery during transportation and/or handling without rupturing. It should also have a relatively low melting point. Representative examples of materials suitable for use with concentrated sulfuric acid include polyethylene, polymers of propylene, vinyl resins, polystyrene and the like, having a thickness of about 2 mils or more. The preferred materials are those which are flexible and can be fabricated into the container by conventional extrusion and sealing techniques.

The heating element can be any conventional device which is capable of heating a small localized area of the electrolyte container, with relatively low power inputs, to a point where a discharge opening is formed therein. The opening can be produced by the combined effect of a reduction of a structural integrity of a localized area of the electrolyte container under the influence of heating and the force resulting from the weight of the electrolyte. It should be appreciated that the amount of heat, and therefore the size of the heating element, required to accomplish this function is dependent to a large degree upon the particular type and thickness of material used for the electrolyte container.

The electrolytic material can be any water-soluble material having both cations and anions compatible with the plates and operating electrolyte and does not otherwise have any deleterious affect on the operation of the battery. For instance, in a lead-acid battery, the use of any materials containing ions which deposit any substantial amounts on the negative plates and results in a lower hydrogen overvoltage, such as the noble metals, copper, nickel, iron, antimony and the like, should be avoided. Representative examples of electrolytic materials which can be used include compounds of magnesium, aluminum, alkali metals, alkaline earth metals, and mixtures thereof, particularly the sulfates and phosphates thereof. Also, immobilized forms of the operating electrolyte as gels, pellets, powder, briquettes, etc. can be used. Examples of various techniques for immobilizing sulfuric acid are disclosed in U.S. Pats. 3,067,275 (aluminum sulfate used as the immobilizing agent) and 3,403,233 (silica used as the immobilizing agent) and copending application Ser. No. 799,679, filed Feb. 17, 1969 and assigned to the assignee of the present application (reaction product of the oxy-acids of boron and phosphorus or their anhydride equivalents used as the immobilizing agent).

Sufficient electrolytic material is provided in each cell compartment to produce, upon dissolution in the water added, an electrolytic solution capable of providing the electrical power necessary to operate the heating element. Generally, about 5 grams to about 50 grams of the electrolytic material will be sufficient. Of course, larger quantities can be used if the added cost of the material is not a controlling factor.

The electrolytic materials can be positioned in any convenient location within the battery cell, such as between the battery element and cell partitions and/or the outer walls, in the mud space below the plates, or above the plates adjacent to the electrolyte container. From available space considerations, the electrolytic material is most advantageously positioned in the mud space below the plates; however, when in-container formation or drying is used, installation below the plates is quite difficult because the elements are previously installed into cell compartments and electrically connected. For dry charge batteries processed by these techniques, the electrolytic material is more conveniently positioned alongside or above the plates. Also, in order to prevent premature release of the concentrated electrolyte from the storage container, the electrolytic material is most advantageously positioned in the uper portion of the cell compartment. Thus, the electrolytic solution is not formed until at least a majority of the water has been added to the cell compartment, thereby precluding a discharge opening being melted into the electrolyte storage container with a partially full cell compartment and a resultant release of concentrated electrolyte causing possible damage to the battery element. The electrolytic material can be installed in the cell compartment in loose form or in a retaining means which allows the incoming water to contact it during the filling operation.

Further advantages of the present invention will become more apparent from the following detailed description of a preferred embodiment, the accompanying drawing and the appended claims.

DESCRIPTION OF THE PREFERRED EMBODIMENTS

Figure 1:
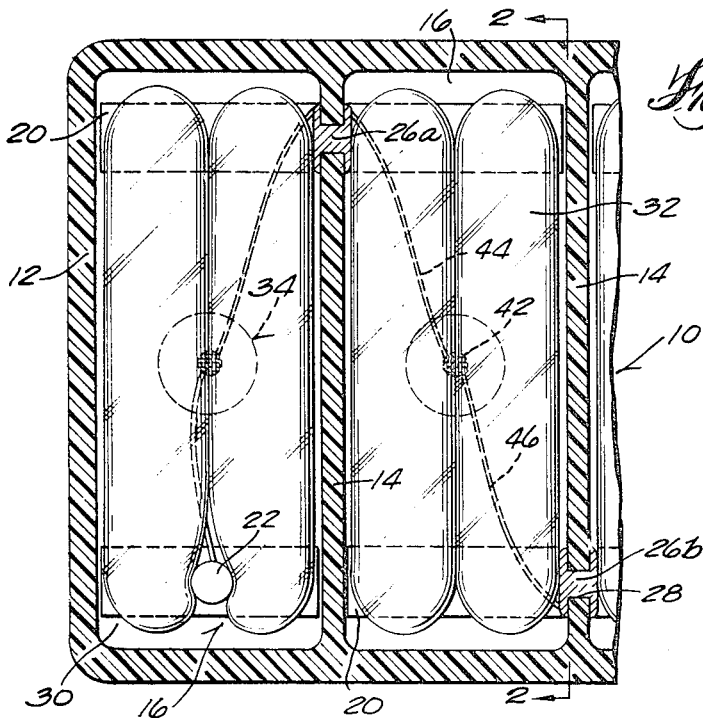
FIG. 1 is a plan view of a portion of a storage battery with part of the container broken away and the cover removed to show the arrangement of the electrolyte container and activator assembly within the cell.
Figure 2:
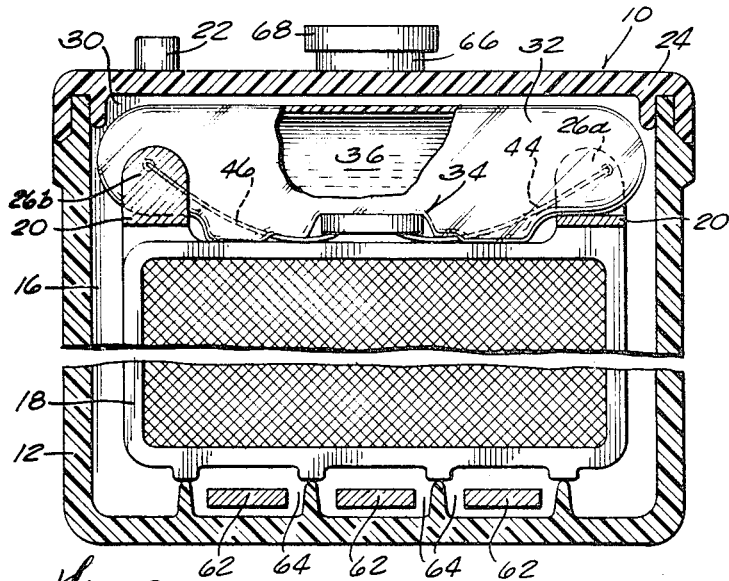
FIG. 2 is a side elevation view, partly in section and with cover installed, taken along the plane designated 2—2 of FIG. 1.

In FIGS. 1 and 2 reference 10 generally designates a battery comprising a casing 12 having a plurality of cell partition walls 14 molded integrally with the container to form cell compartment 16. A conventional dry charge element 18 is mounted in each compartment 16.

Elements 18 are of a conventional design and include positive and negative plates alternately arranged with suitable straps of opposite polarity cast to the respective positive and negative plates of each element. The elements in the end compartments are provided with a terminal post 22 (one shown) which is connected to one of the straps 20 and extends upwardly through the battery cover 24 for external electrical connection into a circuit in which the battery is to be used. Straps 20 (other than those having a terminal post 22 thereon) are provided with upstanding connector lugs 26a, 26b, which are connected through aperture 28 and partition walls 14 by any suitable method, such as that described in U.S. Pat. 3,313,658. The connections are made so that the negative plates of one element are connected to the positive plates of the adjacent element.

A space 30 is provided in each cell compartment between the cover 24, the top of the elements 18 and the walls 14. Located within space 30 in each cell compartment 16 is a sealed thin wall electrolyte container 32 storing a charge of concentrated sulfuric acid 36 and an activator assembly 34 attached thereto. Container 32 can be in the form of a flexible bag as shown, rectangular or any other form or shape adapted to space 30. The containers in the two end cell compartments of the battery are bifurcated at one end to accommodate terminal 22 as shown in FIG. 1.

Figure 4:
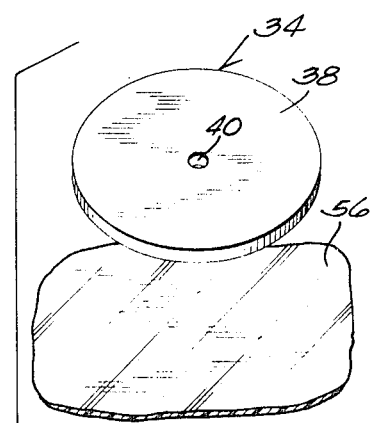
FIG. 4 is an exploded, perspective view of an activator assembly.
Figure 4:
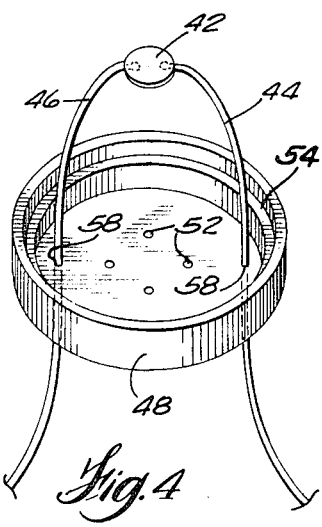
Figure 3:
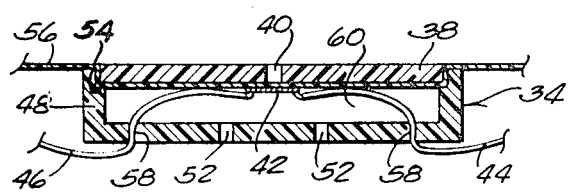
FIG. 3 is a side elevation view, in cross section, of an activator assembly shown attached to the electrolyte containers.

As shown in FIGS. 3 and 4, activator assembly 34 includes a metering device 38 having an aperture 40 and a plurality of grooves emanating radially therefrom, an electrical heating element 42 attached to the bottom of electrolyte container 32, electrical leads 44 and 46 connecting heating element 42 to connector lugs 26a and 26b, respectively, and a fixture 48 having a plurality of apertures 52. Metering device 38, positioned inside electrolyte container 32 is press-fitted onto rim 54 of fixture 48 with a small section 56 of the bottom of the electrolyte container 32 deformed therebetween. Fixture 48 is provided with openings 58 through which electrical leads 44 and 46 extend. Metering device 38 and fixture 48 are constructed from acid-resistant materials, such as polyethylene, polypropylene, vinyl resins, ceramics and the like.

Fixture 48 includes an internal chamber 60 which is substantially air tight so that the volume of air contained therein is compressed when the water added to compartment 16 reaches the level of fixture 48 and enters through apertures 52. As the level of the water rises in chamber 60, the air is compressed until the gas pressure in chamber 60 equals the hydrostatic pressure of the water in cell compartment 16 thereby preventing the water from contacting heating element 42 and dissipating the heat generated by it.

Leads 44 and 46 are constructed from a highly conductive material, and preferably, have an insulative coating to prevent shorting in the event they become detached and fall across the tops of the battery plates during battery operation. Alternately, shorting can be prevented by fabricating the leads from a highly conductive material which is readily dissolved in sulfuric acid. When this latter approach is used, the material dissolved in the sulfuric acid electrolyte should not be deleterious to the performance of the battery. Various alloys, such as magnesium, aluminum and zinc alloys are acceptable for this purpose. Leads 44 and 46 are attached to connector lugs 26a and 26b or to straps 20 in any convenient manner, such as by soldering. Also, leads 44 and 46 can be molded into container 32 or can comprise conductive paths which are applied directly to the bottom of container 32 in any convenient manner, such as screen-painting, brushing, etc.

Small briquettes 62 of a gelled sulfuric acid, formed in accordance with the aforementioned copending application Ser. No. 799,679, are positioned in the mud space 64 at the bottom of casing 12. The total quantity of gelled sulfuric acid in each cell compartment is about 5 to about 50 grams. As a guide, it has been found that 15 grams of a sulfuric acid gel formulated from 2 moles of boric acid and 5 moles of phosphoric acid per 100 moles of 99.5% sulfuric acid, will produce about 15 watts of electrical power for more than one minute which is sufficient to melt an opening into an electrolyte container fabricated from a film of polyethylene approximately 2 mils thick.

When the elements are formed and dried before installation into the battery casing, briquettes 62 can be installed prior to element installation. The gelled sulfuric acid can also be formed in situ by introducing the desired quantity of constituents thereof into the mud space 64 and gellation takes place in the battery. For batteries where in-container drying is used, briquettes 62 can be formed in situ as described above or positioned along the sides of or above elements 18.

Electrolyte containers 32 may be constructed so that, when filled, it is spaced from the cell compartment walls (as shown in FIGS. 1 and 2) so that water introduced into the battery through filling ports 66 flows downwardly along the sides of the container into the cell chamber. Alternately, container 32 can be provided with molded-in channels or ports which permit the flow of water into the cell chambers.

The battery is activated by removing vent caps 68 from filling ports 66 and slowly pouring water through the opening. The total quantity of water added to the cell is that sufficient to dilute the concentrated acid stored in container 32 to the desired specific gravity. Briquettes 62 dissolve in the water forming an electrolytic solution. Since the negative and positive plates are connected externally through leads 44, 46 and heating element 42, the chemical action of the electrolytic solution and the plates result in an electrical current flowing through heating element 42. Heating element 42 generates sufficient heat to melt an opening through the bottom section 56 of electrolyte container 32.

Once an opening is formed in section 56, the concentrated sulfuric acid drains from container 32 through the opening via aperture 40 in metering device 38. The rate at which the concentrated sulfuric acid drains from the container 32, and therefore the rate of carbon dioxide evolution produced by the acid reacting with the plates, is controlled primarily by aperture 40. In other words, the rate of acid discharge is controlled substantially independent of the size, shape and location of the opening formed in section 56 by heating element 42. Accordingly, aperture 40 is sized to provide a drainage or discharge rate of the concentrated acid 36 consistent with a tolerable gas evolution without "boiling" acid out through filling port 66. Radial grooves in the underside of metering device 38 (not shown) assist in the drainage of the acid from container 32 by providing drainage passages between the vicinity of the opening and aperture 40.

As the water rises into chamber 60 of fixture 48 through apertures 52, the air therein is compressed and the resulting pressure prevents the water from contacting heating element 42. Fixture 48 contains several apertures 52 which can act to diffuse the flow of the acid into cell compartment 16 and further promote mixing of the acid with the water.

Although fixture 48 acts somewhat as a baffle for preventing the direct impingement of concentrated acid into battery elements 18, additional protective means, such as a thin film of plastic, can be positioned on the top of the battery elements underneath the container 32 if desired. When container 32 is formed from a thin plastic film and cover 24 is heat sealed to the battery container by conventional techniques, a protective layer of thermal insulation, such as a thin sheet of fiberglas matting, can be placed over the containers 32 to prevent any damage thereto during the sealing operation.

As will be evidenced by those skilled in the art, various modifications and alterations can be made to this invention in view of the full going disclosure without departing from the scope and spirit thereof.

We claim:

1. A water-activatable battery comprising:
   (a) a battery casing having a cover and at least one cell compartment;
   (b) a battery element comprised of at least one positive plate and at least one negative plate positioned within each cell compartment with a space provided within said cell compartment above said element;
   (c) a sealed container storing concentrated electrolyte disposed in such space;
   (d) and electrical heating means electrically connected between said positive and negative plates and positioned in contact with said electrolyte container; and
   (e) a water-soluble, electrolytic material disposed in said cell compartment outside of said sealed container, the quantity of said electrolytic material being sufficient, upon dissolution in water added to cell compartment, to provide an electrolyte solution which along with plates provides sufficient electrical energy to energize said heating means and melt a discharge opening in said electrolyte container.

2. The battery according to claim 1 wherein said electrolytic material is selected from the group consisting of compounds of magnesium, aluminum, alkaline metals, alkaline earth metals, and mixtures thereof and immobilized sulfuric acid.

3. The battery according to claim 1 wherein the amount of said electrolytic material is in the range of about 5 to about 50 grams.

4. The battery according to claim 2 wherein said electrolytic material is disposed in said space.

5. The battery according to claim 2 wherein said electrolytic material is disposed in a space provided below said battery element.

6. The battery according to claim 2 wherein said electrolytic material is an immobilized sulfuric acid.

7. The battery according to claim 2 wherein said heating means is disposed in an activator means which includes a housing juxtaposed said electrolyte container, said housing being arranged with at least one aperture so as to prevent water added to said cell compartment from contacting said heating element prior to the time said discharge opening is formed.

8. The battery according to claim 7 wherein said activator means further includes a metering device associated with said electrolyte container which controls the rate of electrolyte discharge therefrom substantially independent from the size and location of said discharge opening.

9. A method for activating a dry charged storage battery having at least one cell compartment with a battery element positioned therein comprising:
   (a) providing a container storing a predetermined amount of concentrated sulfuric acid in said compartment;
   (b) providing an electrical heating means electrically connected between the positive and negative plates of said element;
   (c) providing an electrolytic material in said cell compartment;
   (d) adding sufficient water to said cell compartment to dilute said electrolyte to a predetermined specific gravity;
   (e) dissolving said electrolytic material to form an electrolytic solution;
   (f) energizing said heating means with electrical energy produced by the voltaic cell formed by said plates and said electrolytic solution; and
   (g) forming a discharge opening in said container with said heating means.

10. The method according to claim 9 wherein said battery is a lead-acid battery and said electrolyte is sulfuric acid.

11. The method according to claim 10 wherein the quantity of said electrolytic material is in the range of 5 to about 50 grams.

12. The method according to claim 11 wherein said electrolytic material is an immobilized sulfuric acid.

References Cited
UNITED STATES PATENTS 2,953,111  9/1960  Jones _____ 136—114
2,980,103  4/1961  Scribner et al. _____ 136—90

WINSTON A. DOUGLAS, Primary Examiner

C. F. LEFEVOUR, Assistant Examiner

U.S. Cl. X.R.

136—90, 161